Feb. 25, 1936.  H. E. TAUTZ  2,032,233
BAND SAW GUIDE
Filed Aug. 1, 1933  2 Sheets-Sheet 1

HERBERT E. TAUTZ
INVENTOR

BY Carl A. Hellmann
ATTORNEY

Feb. 25, 1936.  H. E. TAUTZ  2,032,233
BAND SAW GUIDE
Filed Aug. 1, 1933  2 Sheets-Sheet 2
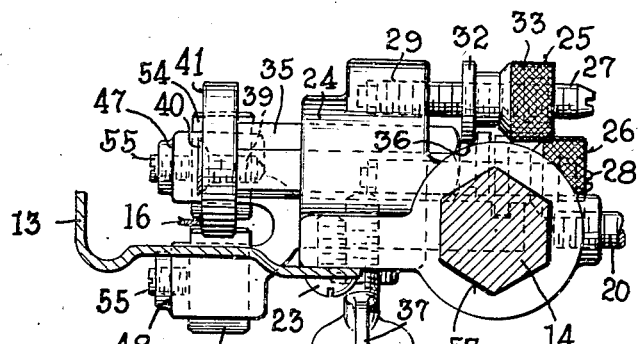
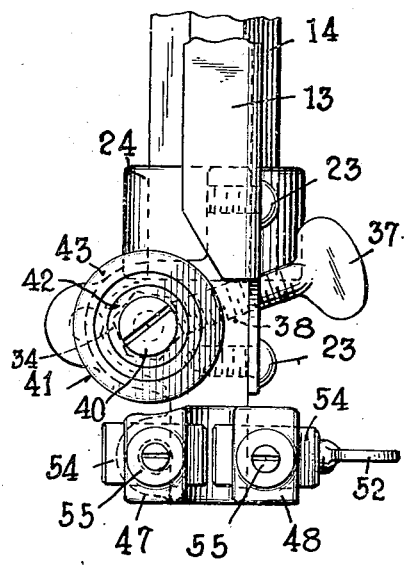
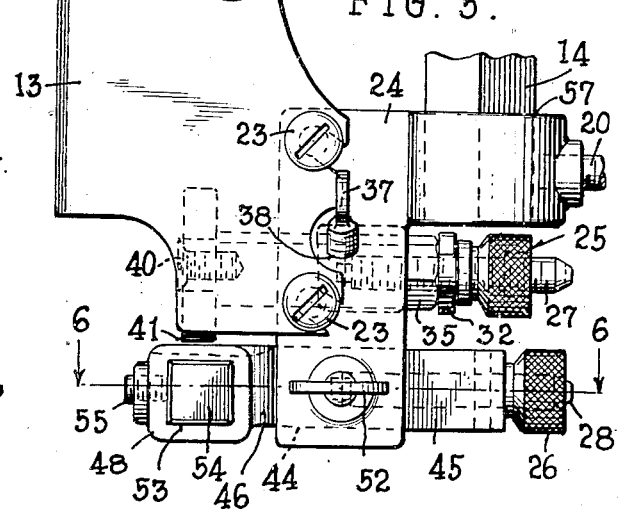
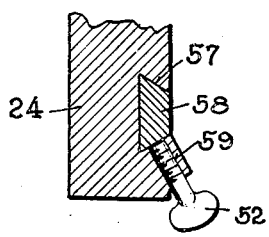
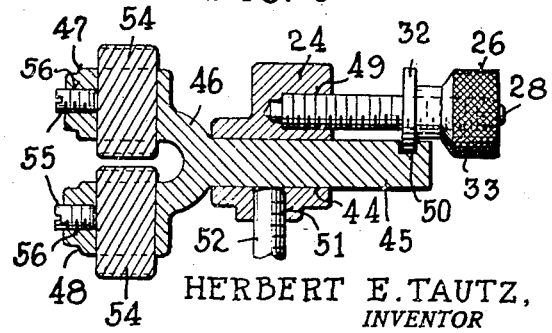
HERBERT E. TAUTZ,
INVENTOR
Carl A. Hellmann,
ATTORNEY Patented Feb. 25, 1936

2,032,233

UNITED STATES PATENT OFFICE 2,032,233

BAND SAW GUIDE

Herbert E. Tautz, Milwaukee, Wis., assignor to Delta Manufacturing Company, Milwaukee, Wis.

Application August 1, 1933, Serial No. 683,206

5 Claims. (Cl. 143—161)

My invention relates to band saw guides.

An object of the invention is to facilitate the adjustment of guides of this type by providing independent means for adjusting various portions thereof, said means being so arranged that adjustment of any one of them has no disturbing effect upon the adjustment of the remaining ones.

The ordinary band saw guide at present in more or less general use comprises a single support carrying a revoluble thrust member against which the back of the band saw blade rests when in operation and a pair of pins having their ends spaced apart suitably to receive the body portion of the saw blade, these two elements serving the respective purposes of preventing the band saw from yielding rearwardly and laterally when in use.

Ordinarily both of these elements are carried by the same bracket or other member, which is itself adjustable to shift both of the elements jointly and an additional adjustment is provided between the bracket and the other element so that the relationship of the two elements may be varied. When such bracket is used it becomes necessary to readjust both elements a number of times until the band saw blade is finally properly alined and guided because each time one of the elements is adjusted, its adjustment is again disturbed by adjusting the other element, thus necessitating repeated trials until the final setting is arrived at.

It is therefore, an object of my invention to eliminate this time-consuming and unsatisfactory need of repeated readjustment of the two elements and this is accomplished by providing each element with independent adjusting means with respect to the bracket which holds both of them.

Specifically the invention relates to a bracket carrying a ball bearing support to receive the rearward thrust of the band saw blade and a set of opposed pins spaced to receive any lateral thrusts thereof, and properly support the blade against twisting out of its correct plane of action.

Figure 1:
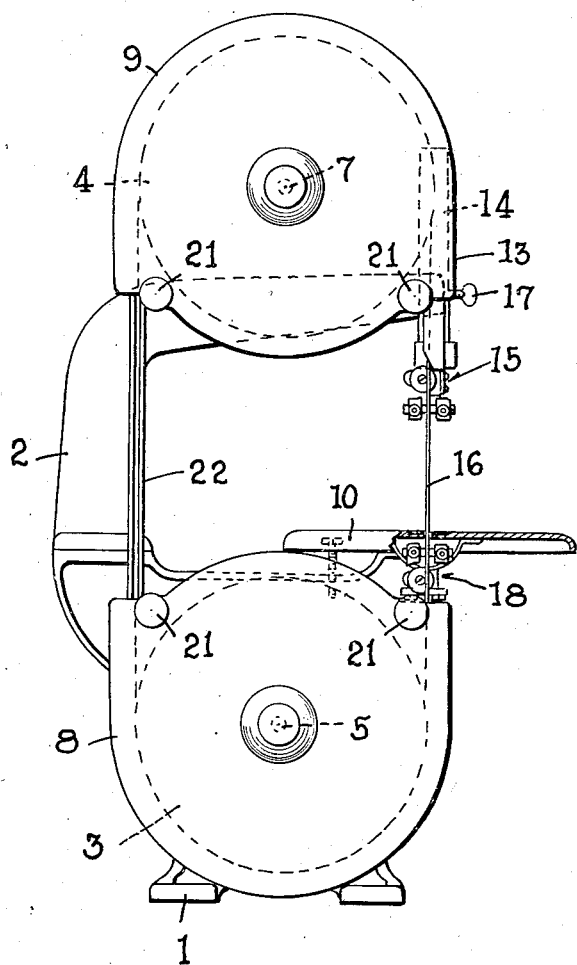
Figure 2:
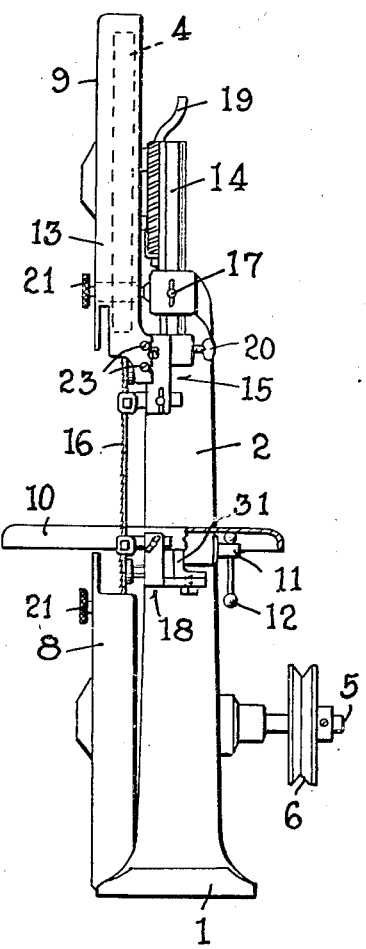

Further objects and advantages of the invention are disclosed in the following specification and the accompanying drawings wherein:

Fig. 1 is a partly sectional front elevation of a band saw to which my invention is applied, Fig. 2 is a partly sectional side elevation of the same, Fig. 3 is a top plan view of a band saw guide employed with said band saw, on a very much larger scale than Figs. 1 and 2, Fig. 4 is a front elevation thereof, Fig. 5 is a side elevation thereof, Fig. 6 is a section of the same on the plane indicated by the line 6—6 of Fig. 5 and Fig. 7 is a diagrammatic view showing a modified form of the invention.

Referring first to Figs. 1 and 2 it will be seen that the band saw comprises a base frame 1 having an upper frame 2 secured thereto, the lower frame having a saw table 10 attached thereto. The saw blade 16 passes over the peripheries of two wheels 3 and 4 mounted on shafts 5 and 7, supported in suitable bearings in the base 1 and upper frame 2 respectively. A suitable pulley 6 is attached to the shaft 5 to drive the saw by means of the said wheels 3 and 4. Means are provided whereby the table 10 may be tilted, as is customary in saws of this type, and a screw 11 having a handle 12 is provided to tighten the said table in any adjusted position. The handle 19 leads to the usual means for raising and lowering the upper wheel 4, whereby the tension of the saw blade 16 may be adjusted.

Guards 8 and 9 are placed over the respective wheels 3 and 4 and a guard 13 is provided which is movable with respect to the upper guard 9 and is secured to the upper saw guide, which is indicated generally as 15. The guards 8 and 9 may be secured to the respective frame members by fastening means 21.

This guide 15 is supported by a rod 14, preferably of polygonal cross section, which is slidable vertically with respect to the upper frame 2 and securable in its adjusted position by means of a thumb screw 17 or equivalent means. The guide 15 is secured to the rod 14 by means of a thumb screw 20 or other suitable means. A further saw blade guard 22 may also be provided as shown.

A lower saw guide 18 is provided below the table and supported by the lower frame member 1, this guide 18 being identical in general with the upper guide 15 as to most of the details thereof. Passing now to Figs. 3–6 the details of the saw guide are illustrated clearly on a very much enlarged scale.

The guide comprises a bracket 24, which in the case of the upper blade guide 15 is secured directly to the rod 14, already described, whereas in the case of the lower blade guide 18 it may be secured to a suitable bracket 31 shown in Fig. 2, which is in turn secured to the lower frame member 1. Aside from slight modifications adapting the two brackets to be thus supported by the rod 14 and bracket 31, respectively, the band saw guides are identical and, therefore, in Figs. 3–6 inclusive, only a single form is illustrated with the understanding that the fundamental features of guides 15 and 18 are identical.

The guard 13, in the case of the upper bracket 15, is secured to such bracket by means of the screws 23, as best shown in Figs. 3 and 5. A suitable bore 29 is provided in the bracket 24 and a screw threaded stud 27 is secured in said threaded bore 29, this stud receiving a correspondingly threaded nut 25 having a flange 32 at one end thereof and a knurled portion 33 at its other end.

The bracket 24 is provided with a bore, preferably of polygonal cross section, as shown at 34, in Fig. 4, in dotted lines, and adapted to receive a correspondingly shaped rod 35 which slides through said bore and has a groove 36 near its rear end, in which engages the flange 32 of the operating nut 25.

It is obvious that by rotating the nut 25 it will move along the screw threaded stud 27 and by virtue of the flange 32 will correspondingly move the polygonal rod 35. A thumb screw 37 may be screwed through a suitable threaded opening 38 in the bracket 24 and engage against one of the faces of the polygonal rod 35, as best shown in Fig. 4, thereby firmly securing the said rod 35 in its adjusted position.

At its forward end, the rod 35 is provided with a threaded bore 39, receiving a screw 40 which cooperates with a thrust bearing 41, preferably of the ball bearing type, said screw securing the inner race member 42 of said bearing firmly to the rod 35 while permitting the outer race member 43 to rotate freely. It will be noted that this ball bearing is reversible, that is, the screw 40 may be removed and the ball bearing 41 reversed and again secured to the rod 35, which is a desirable feature in case one side of the ball bearing races becomes worn out in service due to the uni-directional thrust. This ball bearing 41 serves, of course, to receive the rearward thrust of the saw blade 16 when in operation.

The bracket 24 is provided also with another bore 44 also preferably polygonal, in the present case illustrated as being rectangular in cross section, as shown by Figs. 5 and 6 jointly. Through this bore 44 passes a correspondingly shaped tongue 45, forming part of a member which comprises also a substantially U-shaped portion 46, having the two arms 47 and 48, as shown in Figs. 4 and 6.

The bracket 24 is provided with a suitable screw threaded bore 49, best shown in Fig. 6, into which is screwed and secured a screw threaded stud 28, upon which is engaged an operating nut 26 identical in all respects with the operating nut 25 and having a similar flange 32 and knurled portion 33. The flange 32 of the nut 26 engages in a corresponding groove 50 in the tongue 45 and by operating the nut 26 it is clear that the tongue 45 will correspondingly be moved in one direction or the other through the bore 44.

The tongue 45 may be secured in its adjusted position by means of a suitable thumb screw or the like 52, passing through a correspondingly threaded bore 51 in the bracket 24, as best shown in Fig. 6. The tongue 45, together with the U-shaped portion 46, 47 and 48 constitutes a substantially Y-shaped member, as shown in section in Fig. 6 and each of the arms of the Y is provided preferably with a polygonal bore 53, adapted to receive a bearing member or block 54 of corresponding shape, which may be secured in adjusted position therein by screws 55 threaded into suitable bores 56 in the ends of the arms 47 and 48, the said bearing blocks 54 being slidably adjustable in the said bores 53.

The polygonal rod 14 which supports the upper bracket 15, Figs. 1 and 2, is shown in Fig. 3 as hexagonal in cross section and is received in a corresponding hexagonal bore 57 in said bracket 24.

The lower bracket member 18, of course, does not have the saw guard 13 attached thereto and consequently the screws 23 are also absent therefrom, but in other respects the upper and lower guide brackets 15 and 18 are practically identical and it is believed unnecessary to describe the lower bracket specifically.

Referring now to Figure 7, it will be noted that the invention is not restricted to having parallel bores, such as 34 and 44 in the form above described, but open slots may also be used as well as various other forms of guides. In Figure 7 there is shown a dovetail slot 57 in which is slidably arranged a corresponding shaped tongue or rod 58 which may be secured therein against longitudinal movement by means of a thumb screw 52 screwed into a suitable threaded bore 59. This dovetail tongue 58 may be provided at one end with a suitable groove identical in all respects with the groove 50 shown in Figure 6, for instance, and is intended to be engaged by a similar nut 26 or 25 as the case may be, identical with those illustrated in the preceding figures. It is clear that this tongue or rod 58 may support and operate either the thrust bearing 43 for receiving the rearward thrust of the band saw blade, or the lateral-thrust bearings 54, as the case may be.

This dovetail shaped member or rod 58 may be substituted for either the rod 35 or the rod 45 in the said two cases, or both of said rods may be made of dovetail or other shape and arranged in open slots, if preferred, or if expedient in any given case.

Attention is also directed to the fact that while the rods 35 and 45 in the form of the invention disclosed in Figures 1 to 6 inclusive are parallel with one another, it is not necessary that this be the case and one of said rods may be inclined with respect to the other and to the horizontal plane, or, if there is any reason for so doing, both of them may be inclined to the horizontal and either in the same direction or in opposite directions. Ordinarily, of course, it will be preferred to provide parallel rods, for simplicity and ease of manufacture, but there may be instances wherein the inclined constructions are desirable and other cases wherein it is desirable to provide open slots in place of the bores. It should, therefore, be understood that I consider all these constructions as within the scope of my invention, and that the same is not limited except as expressly provided in the claims.

The operation of the improved guide bracket is believed to be readily evident from the structure thereof. The saw blade 16 passes between the hardened metallic or other suitable blocks 54, 54 of both the upper and lower guide brackets 15 and 18 and these blocks are independently adjustable in a direction transverse to the plane of the saw, so that they may be slid back and forth until they are properly alined with the two sides of the sawblade, leaving the proper desired clearance, but preventing any undesirable twisting or lateral deflection of the saw blade 16 when in use. When so adjusted, these blocks 54 may be secured in their adjusted positions by suitably tightening the screws 55. The polygonal shape of the tongue 45 prevents any rotation of the Y-shaped member about its own axis in the bore 44.

The thrust bearing 43 may now be adjusted to bring the forward surface thereof against the rear edge of the saw blade 16 in order to bring the saw 16 into its proper adjusted position in a forward-and-back direction, this adjustment being made by suitably rotating the nut 25 upon its screw threaded stud 27, whereupon the rod 35 may be clamped in its adjusted position by tightening the thumb screw 37.

If now it should be found that the saw blade does not properly engage between the blocks 54 of the Y-shaped member, this member should be adjusted forward or back as necessary by rotating the nut 26 upon its screw threaded stud 28, until the saw blade is engaged between the inner ends of the bearing blocks 54 with the saw teeth projecting forwardly out of contact with such blocks, so that the "set" of the teeth may not collide with the ends of the blocks 54, but so that nevertheless the saw blade may be given the maximum possible support and bearing against the blocks 54, so as to support the blade as securely as possible against twisting and lateral movement. When such adjustment has been secured the tongue 45 may be permanently secured in its adjusted position by tightening the thumb screw 52 and such adjustment need not be disturbed until some change is to be made in the saw blade.

An important feature of the present invention is that entirely independent adjustment is provided for the thrust bearing 41 and the lateral bearing blocks 54, so that either the Y-shaped member or the rod 35 may be adjusted independently of the other and locked in the adjusted position.

This is an important feature and very materially facilitates the adjustment of the blade particularly for unskilled operators, because once either adjustment is made it need not be disturbed to make the other adjustment, as was necessary in the band saw guides heretofore in general use.

The bracket 24 is, of course, adjustable vertically in the customary manner in the upper frame 2 of the band saw, by virtue of the slidable rod 14, to accommodate workpieces of different thickness lying on the table 10 and when so adjusted the rod 14 may be secured in its desired position by the thumb screw 17 or equivalent device.

While the tongue 45 has been shown as rectangular in cross section and the rods 35 and 14 as hexagonal, it is obvious that these shapes are arbitrary and that any other polygonal shapes may be substituted, or even cylindrical shapes may be used, if desired, although certain of the advantages of the invention would be lost if the said members have not at least one flat surface to be guided and clamped by the respective thumb screws 20, 37 and 52, except, of course, in the case of the rod 35, which might equally well be cylindrical inasmuch as its rotation about its own axis will have no effect upon the effective position of the thrust bearing 41 carried thereby.

When the modified form of support, disclosed, for example, in Figure 7, is employed in place of the ones disclosed in Figures 1 to 6 inclusive, it is clear that the operation of the device will be practically the same. An advantage of an open slot construction in place of the closed bores is that the rods supporting the guides may in certain cases be readily removed, particularly where such slots have parallel sides instead of being dovetail slots and in certain cases this may be an advantage, although, in general, it will be preferred to provide the polygonal bores, which make it possible to hold the rods more securely. Whatever the shape of the slot or bore used, however, it is evident that the operation of the Figure 7 form will be substantially the same as that of the preceding forms.

Having described certain preferred embodiments of my invention and enumerated certain of the advantages secured thereby it is evident that other objects and advantages not specifically mentioned are also inherent therein and it is, therefore, obvious that many changes may be made in the specific details of the device without departing from the invention or sacrificing any or all of the advantages thereof.

Therefore, for an understanding of the scope of the invention reference should be had to the following claims.

I claim:

1. A saw guide comprising a bracket having two bores therein, a rod slidably arranged in each bore, an end-thrust bearing carried by one of said rods, means for positively moving said rod in both directions in its bore, the second rod having a forked end, each arm of the fork having a polygonal bore therein, and having lateral-thrust bearing blocks carried slidably in said polygonal bores, and independent means for positively moving said second rod in both directions in its bore.

2. A saw guide comprising a bracket having two guideways therein, a rod slidably arranged in each guideway, an end-thrust bearing carried by one of said rods, means for adjusting said rod in its guideway, the second rod having a forked end, lateral-thrust bearings carried by the forked end of the second rod, and independent means for positively adjusting said second rod in both directions in its guideway.

3. A saw guide comprising a bracket having two parallel bores therein, both said bores being polygonal in cross section, a rod slidably but non-rotatably arranged in each bore, an end-thrust bearing carried by one of said rods, the other rod having a forked portion beyond the portion engaged in the bore, lateral-thrust bearings carried by the forked end of the second rod, means comprising screw-threaded studs secured to the bracket, and nuts each having a single flange for adjusting a corresponding one of said rods, each nut being threaded on a respective one of said studs, each said rod being provided with a recess to receive the flange of its respective adjusting nut.

4. A saw guide comprising a bracket having two guideways therein, a support movably arranged in each guideway, an end-thrust bearing carried by one of said supports, means for positively moving said support in both directions in its guideway, the second support having a forked end, each arm of the fork having a guideway therein, and having lateral-thrust bearing blocks carried movably in said last-named guideways, and independent means for positively moving said second support in both directions in its guideway.

5. A saw guide comprising a bracket having two guideways therein, a support movably arranged in each guideway, an end-thrust bearing carried by one of said supports, means for adjusting said support in its guideway, the second support having a forked end, lateral-thrust bearings carried by the forked end of the second support, and independent means for positively adjusting said second support in both directions in its guideway.

HERBERT E. TAUTZ.